United States Patent
Gehin-Delval et al.

(10) Patent No.: US 10,383,352 B2
(45) Date of Patent: Aug. 20, 2019

(54) FOOD COMPOSITION COMPRISING GAS BUBBLES

(71) Applicant: NESTEC S.A., Vevey (CH)

(72) Inventors: Cecile Gehin-Delval, Les Hopitaux Neufs (FR); Helen Chisholm, Cheseaux (CH); Zeynel Deniz Gunes, Lausanne (CH); Helene Deyber, Jougne (FR); Cindy Pelloux, Thonon-les-Bains (FR); Olivier Schafer, Epalinges (CH); Corinne Appolonia Nouzille, Lausanne (CH); Mathieu Julien Destribats, Belmont sur Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 147 days.

(21) Appl. No.: 15/558,399

(22) PCT Filed: Mar. 22, 2016

(86) PCT No.: PCT/EP2016/056269
§ 371 (c)(1),
(2) Date: Sep. 14, 2017

(87) PCT Pub. No.: WO2016/150968
PCT Pub. Date: Sep. 29, 2016

(65) Prior Publication Data
US 2018/0049456 A1 Feb. 22, 2018

(30) Foreign Application Priority Data

Mar. 23, 2015 (EP) .................................... 15160345
Mar. 23, 2015 (EP) .................................... 15160354

(51) Int. Cl.
*A23L 27/60* (2016.01)
*A23L 2/54* (2006.01)
(Continued)

(52) U.S. Cl.
CPC .............. *A23L 27/60* (2016.08); *A23D 7/001* (2013.01); *A23D 7/003* (2013.01); *A23D 7/04* (2013.01);
(Continued)

(58) Field of Classification Search
CPC . A23L 27/60; A23L 2/54; A23L 33/20; A23L 23/00; A23L 35/10; A23L 29/10;
(Continued)

(56) References Cited

U.S. PATENT DOCUMENTS 2,836,497 A * 5/1958 Levin ..................... A23D 7/003
426/116
2,844,469 A * 7/1958 Melnick .................. A23L 27/60
426/116
(Continued)

FOREIGN PATENT DOCUMENTS

DE 102012021545 4/2014

OTHER PUBLICATIONS

Brooker, B.E. "The Stabilisation of Air in Foods Containing Fat—A Review" Food Structure, 1993, vol. 12, No. 1, pp. 115-122.
(Continued)

*Primary Examiner* — Cephia D Toomer
(74) *Attorney, Agent, or Firm* — K&L Gates LLP (57) ABSTRACT

The present invention relates in general to field of food and drinks. In particular, it relates to a food composition comprising a lipid-in-water emulsion wherein gas is dispersed in the lipid in the form of a foam. Triglyceride crystals are present at the gas-lipid interface. The invention also provides a process for forming such a food composition.

15 Claims, 5 Drawing Sheets

(51) Int. Cl.
    *A23P 30/40*    (2016.01)
    *A23L 33/20*    (2016.01)
    *A23L 23/00*    (2016.01)
    *A23D 7/00*     (2006.01)
    *A23D 7/04*     (2006.01)
    *A23L 35/00*    (2016.01)
    *A23L 29/10*    (2016.01)
    *A23L 29/30*    (2016.01)
    *A23G 1/56*     (2006.01)

(52) U.S. Cl.
    CPC ............... *A23G 1/56* (2013.01); *A23L 2/54* (2013.01); *A23L 23/00* (2016.08); *A23L 29/10* (2016.08); *A23L 29/30* (2016.08); *A23L 33/20* (2016.08); *A23L 35/10* (2016.08); *A23P 30/40* (2016.08); *A23V 2002/00* (2013.01)

(58) Field of Classification Search
    CPC ........... A23L 29/30; A23P 30/40; A23G 1/56; A23V 2002/00; A23D 7/001; A23D 7/003; A23D 7/04
    See application file for complete search history.

(56) References Cited

U.S. PATENT DOCUMENTS

| | | | |
|---|---|---|---|
| 2,844,470 A * | 7/1958 | Akerboom | A23L 27/60 426/116 |
| 3,549,387 A | 12/1970 | Howard | |
| 4,919,964 A | 4/1990 | Adams et al. | |
| 2005/0142275 A1 | 6/2005 | Bach et al. | |
| 2007/0264406 A1* | 11/2007 | Beutler | A23C 9/1524 426/564 |

OTHER PUBLICATIONS

Goff et al. "A study of fat and air structures in ice cream" International Dairy Journal, 1999, vol. 9, pp. 817-829.

* cited by examiner

FOOD COMPOSITION COMPRISING GAS BUBBLES

CROSS REFERENCE TO RELATED APPLICATIONS

The present application is a National Stage of International Application No. PCT/EP2016/056269, filed on Mar. 22, 2016, which claims priority to European Patent Application No. 15160345.3, filed on Mar. 23, 2015, and European Patent Application No. 15160354.5, filed on Mar. 23, 2015, the entire contents of which are being incorporated herein by reference.

FIELD OF THE INVENTION

The present invention relates in general to field of food and drinks. In particular, it relates to a food composition comprising a lipid-in-water emulsion wherein gas is dispersed in the lipid in the form of a foam. The invention also provides a process for forming a food composition.

BACKGROUND OF THE INVENTION

Fats are an important part of our diet; they provide the body with energy and with some important vitamins (for example, vitamins A and D). They also contain essential fats which the body is unable to make for itself. However, eating too much fat can be unhealthy. The consumption of saturated fats may be associated with increased blood cholesterol levels which may result in coronary heart disease, for example.

Current UK government guidelines advise cutting down on all fats and replacing saturated fat with some unsaturated fat. Many consumers try to reduce fat intake, but they are more likely to succeed if reduced fat food products are available which provide the same eating pleasure as their full-fat equivalents.

It is challenging to reduce the fat content of food without altering its essential sensory character, such as flavour, mouthfeel, and aroma. Food which are lipid-in-water emulsions present particular challenges. Such emulsions are common in food, being present in foods such as mayonnaise, salad dressings, sauces, and milk. One approach to reduce the fat content in products such as mayonnaise is to remove the fat completely and add texture modifying ingredients to the mayonnaise to try and simulate the mouthfeel generated by fat. However, the texture difference is often apparent to the consumer, and the ingredients used to modify the texture may be food additives that the consumers prefers not to eat.

Providing fat in the form of a foam provides a method to maintain product volume whilst reducing the fat content. However, the major difficulty in generating stable foam structures within lipid-based systems as compared to water-based systems lies in the lack of suitable surfactants for forming stable interfaces between air and lipid. Those surfactants which have been proposed may not be suitable for stabilizing edible foams due to toxicity or unpleasant taste. As a consequence, the most common approach for obtaining stable foams in fats is by forming a rigid network in the bulk material, for example by forming a rigid network of crystals in a liquid lipid continuous phase or by rapidly cooling the lipid so as to solidify the bulk material.

In the case of food products based on lipid-in-water emulsions, stabilizing the fat foam by solidification or by forming a rigid network in the bulk material would cause a significant change in texture. Lipid-in-water emulsions also present a major technical problem in that any fat foam must be stable enough to survive being emulsified into the aqueous phase. Having a rigid network in the bulk liquid fat material affects the ability of the foam to be pumped, deposited, or mixed with other components without destroying the stabilizing network leading to coalescence of bubbles.

Hence, there is a need in industry to provide reduced-fat food compositions based on lipid-in-water emulsions, in particular edible emulsions which taste good and are made from natural ingredients. An object of the present invention is to improve the state of the art and to provide an improved solution to overcome at least some of the inconveniences described above or at least to provide a useful alternative. Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The object of the present invention is achieved by the subject matter of the independent claims. The dependent claims further develop the idea of the present invention.

SUMMARY OF THE INVENTION

Accordingly, the present invention provides in a first aspect a food composition comprising a lipid-in-water emulsion wherein gas is dispersed in the lipid in the form of a foam, and wherein the foam comprises gas bubbles having triglyceride crystals at their gas-lipid interface. In a second aspect, the invention relates to a process for forming a food composition, the process comprising the steps of providing a first composition comprising triglycerides and having a lipid continuous phase; controlling the temperature of the first composition such that the composition comprises triglyceride crystals and has a solid lipid content between 0.1 and 20%; aerating the first composition to form a foam; providing a second composition having an aqueous continuous phase and comprising an emulsifier; and mixing the first and second compositions to form a lipid-in-water emulsion having gas dispersed in the lipid in the form of a foam.

It has been surprisingly found by the inventors that, by cooling a liquid lipid composition comprising triglycerides to a temperature at which there is partial crystallization and then whipping the composition, a stable foam is produced. The gas bubbles in the foam were found to be coated in triglyceride crystals. By using a process of prolonged and intensive whipping, very stable assemblies of crystal-wrapped bubbles can be obtained. The crystals jam together around the bubble, leading to mechanical stability and resisting bubble shrinkage. The bulk remains soft, e.g. there is no rigid network of crystals in between the bubbles. The foam can be diluted with additional oil and still remain stable (unless so much oil is added that it dissolves the crystals). The foam is not easily destabilized under mechanical processing, unlike many particle-stabilized foams or conventional surfactant stabilized foams. The foam is sufficiently stable to allow it to be emulsified into an aqueous phase, allowing the formation of a lipid-in-water emulsion wherein gas is dispersed in the lipid in the form of a foam, in other words an air-in-oil-in-water structure.

DETAILED DESCRIPTION OF THE INVENTION

Consequently the present invention relates in part to a food composition comprising a lipid-in-water emulsion wherein gas is dispersed in the lipid in the form of a foam, and wherein the foam comprises gas bubbles having triglyceride crystals at their gas-lipid interface.

The term "food composition" in the scope of the current invention includes both food and beverages.

A foam is a dispersion of a gas in a solid or liquid medium. The gas may be any gas commonly used for foam generation such as $CO_2$, $N_2$ or $N_2O$, but typically the gas is air. The lipid phase of the lipid-in-water emulsion according to the invention may comprise lipidic solids, semisolids or liquids; preferably the lipid phase is flowable, for example it flows under gravity at 20° C. The foam according to the food composition of the invention may have a porosity of between 1 and 80%, for example between 10 and 75%. The term porosity refers to the fraction of the volume of gas-filled voids over the total volume, as a percentage between 0 and 100%.

Triglycerides, also called triacylglycerols or triacylglycerides, are esters derived from glycerol and three fatty acids. The triglyceride crystals at the gas-lipid interface of the foam stabilize the gas bubbles. When crystals occupy a high proportion of the surface of the gas bubbles the crystals jam together, resisting any shrinkage of the bubbles and providing a stable, flowable foam. The flowable foam may be flowable under gravity at 20° C. after stirring. The triglyceride crystals at the gas-lipid interface of the foam may cause the bubbles to have a non-relaxing shape, for example when distorted by shear or when the foam is diluted with oil.

Being a food composition, all components should be edible. The term "edible" refers to substances which can be eaten safely. Whilst the current invention is not limited to substances permitted for consumption in any particular jurisdiction, the food composition may for example comprise materials approved for human consumption by the U.S. Food and Drug Administration. Many consumers prefer to eat foods with familiar ingredients, ideally from natural sources. It is an advantage that the foam emulsified in the food product of the invention may be stabilized by triglycerides as these have good consumer acceptance. The food composition of the invention may be free from synthetic emulsifiers. The food composition of the invention may be free from diacetyl tartaric acid esters, sodium or calcium stearoyl-2-lactylate, ammonium phosphatide, sorbitan tristearate, mono and diglycerides of fatty acids, polysorbates, citric acid esters of mono and diglycerides, polyglycerol esters and lactic acid esters. For example the food composition of the invention may be free from mono and diglycerides of fatty acids.

The lipids emulsified in the food composition of the invention may be fats. In the context of the current invention, the term "fats" is synonymous with triglycerides. The terms "oils" and fats are used interchangeably, although conventionally in the food industry the term oils most commonly refers to those fats which are liquid at room temperature. The lipids emulsified in the food composition of the invention may be conventional vegetable fats, for example at least 95 wt. % (for example at least 99 wt. %) of the lipids may be triglycerides having fatty acid moieties with fewer than 22 carbons, for further example at least 95 wt. % (for example at least 99 wt. %) of the lipids may be triglycerides having an average fatty acid chain length less than 20. The triglyceride palmitic-oleic-stearic (POSt) has an average chain length of 3.7.3 as palmitic acid is C16, oleic acid is C18 and stearic acid is C18. Higher chain-length fatty acids in the triglycerides, especially saturated ones, affect the organoleptic properties of the foam, giving a heavy and waxy mouthfeel. The vegetable fats may be blends, and may have been hydrogenated or inter-esterified. The lipids emulsified in the food composition of the invention may comprise fats such as coconut oil, palm kernel oil, palm oil, cocoa butter, butter oil, lard, tallow, oil/fat fractions such as lauric or stearic fractions, hydrogenated oils, and blends thereof as well as sunflower oil, rapeseed oil, olive oil, soybean oil, fish oil, linseed oil, safflower oil, corn oil, algae oil, cottonseed oil, grape seed oil, nut oils such as hazelnut oil, walnut oil, rice bran oil, sesame oil, peanut oil, palm oil, palm kernel oil, coconut oil, and emerging seed oil crops such as high oleic sunflower oil, high oleic rapeseed, high oleic palm, high oleic soybean oils & high stearin sunflower or combinations thereof. For example, the lipid emulsified in the food composition of the invention may comprise fats selected from the group consisting of cocoa butter, shea butter, illipe butter, sal fat, kokum butter, mango kernel fat, palm oil, coconut oil, soybean oil, rapeseed oil, cottonseed oil, sunflower oil, safflower oil, olive oil and hydrogenation products, inter-esterification products, fractions and combinations of these. For example, the lipid emulsified in the food composition of the invention may comprise fats selected from the group consisting of cocoa butter, shea butter, illipe butter, sal fat, kokum butter, mango kernel fat, palm oil, coconut oil, soybean oil, rapeseed oil, cottonseed oil, sunflower oil, safflower oil, olive oil and inter-esterification products, fractions and combinations of these.

The triglyceride crystals at the gas-lipid interface of the foam of the food composition of the invention may occupy at least 50% of the surface of the gas bubbles. The crystals at the surface of the bubbles may be visualized by microscopy and image analysis used to quantify the degree to which the surface is occupied. With a high level of surface coverage it may be immediately obvious after inspection by microscopy that at least 50% of the surface of the gas bubbles is occupied by crystals. The triglycerides crystals at the gas-lipid interface of the foam of the food composition of the invention may form layers having an average thickness below 5 µm, for example below 2 µm. The triglycerides crystals at the gas-lipid interface of the foam of the food composition of the invention may form layers having an average thickness between 0.01 µm and 5 µm, for example between 0.05 µm and 2 µm, for further example between 0.2 µm and 1 µm. Thin layers of crystals provide an advantage as a smaller amount of crystals are required to wrap the bubbles and hence a smaller amount of higher melting components. As the bubble size in a foam decreases, for the same volume of gas in the foam overall the surface area of the bubbles increases, and so more crystals would be needed to coat the bubbles. As the invention provides gas bubbles coated with thin layers of crystals, foams with low densities can be formed with a small bubble size, providing interesting and attractive textures. Food emulsions are prepared with different oil droplet sizes depending on the desired texture. Small oil droplets may provide a more stable emulsion, being less likely to separate and "cream". It is beneficial that the invention provides small bubbles which can be contained within small lipid droplets in the emulsion.

The gas-lipid interface of the foam according to the food composition of the invention may comprise gas bubbles having their surface occupied by triglyceride crystals such that the surface density of triglycerides is at least 3.5 mg·m$^{-2}$, for example at least at least 25 mg·m$^{-2}$, for example at least 50 mg·m$^{-2}$, for further example at least at least 200 mg·m$^{-2}$. The surface density of triglycerides at the surface may be measured by diluting foams by oil addition and gentle manual stirring. The samples are then left to at rest until phase separation occurred between an upper layer formed by bubble accumulation, due to buoyancy mismatch between air and the continuous oil phase, and a bottom phase formed by oil and the remaining non-adsorbed triglyceride crystals. The upper foam layers are then carefully removed and the subnatants are collected for analysis. The concentration of triglycerides can be determined by gas-chromatography. From the initial concentration of triglycerides in the material before whipping (the gel) and the measured concentration in the supernatant, the interfacial area can be calculated:

Interfacial Area (S) Developed by a Foam:

$$S = \frac{6\phi V}{D}$$

V: volume of foam (m$^3$)
φ: porosity
D: bubble Sauter diameter (m) as measured by optical microscopy/tomography
OR/porosity: The levels of aeration may be estimated by Over-Run (OR) or porosity
(φ) measurements in standardized plastic cups.

$$\% \, OR = \frac{m_{non\,aerated} - m_{aerated}}{m_{aerated}} \times 100$$

$$\% \, \phi = \frac{OR}{OR + 100} \times 100$$

Concentration of adsorbed triglycerides at interface:

$$c_{ads} = c_{ini} - c_{non-ads} \times X$$

$C_{ads}$: glyceride concentration, relative to the oil phase, adsorbed at the air-oil interface of the bubbles
$C_{ini}$: initial concentration of glyceride in the gel
$C_{non-ads}$: non-adsorbed glyceride concentration as titrated from the diluted subnatant
X: dilution factor applied to the foam before collecting the subnatant Adsorption Surface Density:

$$\Gamma = \frac{c_{ads}(1 - \phi)V}{S}$$

The lipid foam does not rely on a rigid network in the bulk lipid material between the bubbles in order to provide stability. This allows the bulk lipid to be liquid and so provides a smooth fluid texture for the emulsion. The presence of gas bubbles in the emulsified oil may impart a texture to the emulsion that tasters describe as more creamy. At temperatures above 10° C. (for example above 15° C., for further example above 20° C.) the bulk lipid in the emulsified foam according to the present invention does not contain a rigid network. In the current invention the term "bulk lipid" refers to the lipid which is not at an interface. In the case of a foam where the bubbles are closely packed, the crystals at one gas-lipid interface may interact with those at another interface, but this is not a network in the bulk lipid. A rigid network is present when flow induces partial instability of the structure. On applying shear to a rigid network, a solid type of initial flow is observed. For example if a system having a rigid network is sheared in a rheometer, an initial resistance of elastic (or rigid) type would be observed, followed by a transition through maximal resistance (breakage of the rigid structure) before the structure would return to being flowable (at least in part). The transition is then not rapidly reversible (no rapid recovery of the rigid network e.g. within a few seconds or minutes). This is in contrast to the behaviour of materials having no rigid network.

The crystallization behaviour of the lipid comprised within the food composition of the invention may be examined using differential scanning calorimetry (DSC), a technique in which the difference in the amount of heat required to increase the temperature of a sample and reference is measured as a function of temperature. For example, a sample comprising the lipid phase may be heated to completely melt all the lipid, cooled to record the crystallization signature and then reheated to record the melting signature. When the cooling protocol brings the mixture so low in temperature that the system solidifies in bulk then the lipid phase in the foam of the current invention may show at least two distinct endothermic melting "peaks" during the reheating phase, the at least two endothermic melting "peaks" being separated by at least 10° C., for example at least 15° C., for example at least 20° C. The area under each of the at least two peaks may be at least 10% of the area under all peaks in the melting trace. Depending on the DSC equipment used, endothermic heat flows may be shown as positive or negative peaks.

Most lipid materials used commercially are mixtures of different molecules. Vegetable and animal fats for example contain a range of different triglycerides. As a consequence, when cooling these fats, a fraction of the triglycerides will start to crystallize while the rest of the fat remains liquid. The inventors have found that by cooling liquid fats so that part of the triglycerides crystallize, and then aerating the cooled fats, a stable foam may be produced. The inventors found for example that on cooling olive oil (80% refined, 20% extra virgin) to −23° C. a gel forms. After re-warming the gel by leaving at 5° C. for 3 hours, whipping the gel creates a stable foam (overrun around 65%) with gas bubbles having their surface occupied by triglyceride crystals. This foam can then be emulsified into an aqueous phase. For ease of processing, the temperature may be raised before whipping, as long as some crystals and the gel remain. For example the inventors were able to whip the olive oil gel at 5° C., after solidifying it by cooling it to e.g. −10° C. and leaving it at −10° C. for a few hours, then leaving to partially melt at 5° C. before whipping. In such a foam, no additional stabilizer material needs to be added to the liquid fat to enable a foam to be formed. Accordingly, in one embodiment of the invention, the lipid comprised within the food composition of the invention comprises one or more fats and the triglyceride crystals at the gas-lipid interface comprise triglycerides from all the one or more fats. The fats may be vegetable fats. The fats may be selected from the group consisting of cocoa butter, olive oil, high stearic sunflower oil and combinations of these. The composition of triglyceride crystals at the gas-lipid interface may be richer in higher melting triglycerides than the bulk fat.

The inventors have found that good results may be obtained using a fat or blend of fats having a broad range of crystallization temperatures. Such fats or blends of fats have broad ranges of crystallization peaks when measured in a differential scanning calorimeter (DSC). These broad ranges of crystallization temperatures allow flexibility in selecting a temperature at which the lipid phase has sufficient solid lipid content to provide triglyceride crystals at the gas-lipid interface of the foam, but does not have such a high amount of solid lipid that the lipid phase is too viscous to process and aerate efficiently. DSC measurements of fats are conveniently carried out between 80° C. and −20° C. The lipid phase in the foam of the invention may have at least 80% of its total crystallization enthalpy between 80° C. and −20° C. occurring in a temperature range of at least 20° C., for example a range of at least 30° C. The lipid phase in the foam of the invention may have at least 50% of its total crystallization enthalpy between 80° C. and −20° C. occurring in a temperature range between 40° C. and 15° C., for example at least 80% of its total crystallization enthalpy between 80° C. and −20° C. occurring in a temperature range between 40° C. and 15° C. The lipid phase in the foam of the invention may have at least 50% of its total crystallization enthalpy between 80° C. and −20° C. occurring in a temperature range between 20° C. and −5° C., for example at least 80% of its total crystallization enthalpy between 80° C. and −20° C. occurring in a temperature range between 20° C. and −5° C. Crystallization enthalpy measurements may for example be measured by DSC.

In another embodiment of the invention, one or more higher melting-point fats may be included in the lipid phase of the foam to promote the formation of crystals at the gas-lipid interface when the majority of the lipid phase is still liquid. The lipid comprised within the food composition of the present invention may comprise one or more higher melting-point (HMP) fats and one or more lower melting-point (LMP) fats; the melting-point of the lowest melting higher melting-point fat being at least 10° C. (for example at least 15° C., for example at least 20° C.) above that of the melting point of the highest melting lower melting-point fat; and the lower melting-point fats being present at a level of greater than 50 wt. % of the total lipid, for example greater than 60 wt. %, for example greater than 70 wt. %, for example greater than 90 wt. %. A lipid phase composition as described facilitates the formation and stability of the emulsified foam, with crystals from the higher melting-point fats occupying the gas bubble surfaces while the lower melting-point fats maintain a fluid continuous phase.

Consider a lipid phase which consists of 6 wt. % high melting palm oil fraction (mpt. 63° C.), 40 wt. % cocoa butter (mpt. 35° C.) and 54 wt. % high oleic sunflower oil (mpt.—17° C.). The lipid phase has two HMP fats (high melting palm oil fraction and cocoa butter) and one LMP fat (high oleic sunflower oil). The melting point of the lowest melting HMP fat (cocoa butter) is 35° C., which is at least 10° C. above that of the melting point of the highest melting LMP fat, i.e. high oleic sunflower oil with a melting point of −17° C. The LMP fat (HOSFO) is present at 54 wt. % of the total lipid.

For different product applications and usage temperatures, the melting points of the fats in the lipid phase may vary. The melting-point of the lowest melting HMP fat may be above 10° C., for example above 20° C., for example above 30° C., for example above 40° C. A combination of a small quantity of high melting fat with a large amount of low melting fat can provide a stable emulsified foam at room temperature and below, which is particularly beneficial for food compositions as they can be stable without being excessively waxy in the mouth, and without an unwanted increase in saturated fat content. For example, the melting-point of the lowest melting HMP fat may be above 40° C., for example between 40 and 90° C., and the lower melting-point fats may be present at a level of greater than 90 wt. %. For example, the melting-point of the lowest melting HMP fat may be above 30° C., for example between 30 and 50° C., and the lower melting-point fats may be present at a level of greater than 75 wt. %. The crystals occupying the surface of the gas bubbles may comprise triglycerides from the HMP fats. Fats present in minor quantities with melting-points between the temperature of the lowest melting HMP fat and the highest melting LMP fats do not significantly affect the efficiency of foam formation. The melting-point of the lowest melting higher melting-point fat may be at least 10° C., for example at least 15° C., for example at least 20° C., above that of the melting point of the highest melting lower melting-point fat when fats present at levels below 1 wt. % of the lipid content of the lipid phase are discounted. The melting-point of a fat may for example be the temperature at which it has a 1% solid fat content as measured by pulsed NMR. The one or more higher melting-point fats in the food composition of the invention may be selected from the group consisting of cocoa butter, shea butter, illipe butter, sal fat, kokum butter, mango kernel fat, palm kernel oil, palm oil, coconut oil, milk fat, high stearic sunflower oil and hydrogenation products, inter-esterification products, fractions and combinations of these; and the one or more lower melting-point fats may be selected from the group comprising sunflower oil (high oleic and standard), coconut oil, safflower oil, rapeseed oil, olive oil and combinations and fractions of these. The one or more higher melting-point fats in the foam of the invention may have a melting point above 20° C. and the one or more lower melting-point fats in the foam of the invention may have a melting point below 20° C.

The higher melting-point fats in the food composition of the invention may comprise cocoa butter, for example inter-esterified cocoa butter, and the lower melting-point fats in the food composition of the invention may comprise sunflower oil, for example high oleic sunflower oil. The higher melting-point fats in the food composition of the invention may comprise a high melting fraction of palm oil, and the lower melting-point fats in the food composition of the invention may comprise sunflower oil, for example high oleic sunflower oil. The higher melting-point fats in the food composition of the invention may comprise hydrogenated coconut oil and the lower melting-point fats in the food composition of the invention may comprise sunflower oil, for example high oleic sunflower oil. The higher melting-point fats in the food composition of the invention may comprise hydrogenated palm kernel oil and the lower melting-point fats in the food composition of the invention may comprise sunflower oil, for example high oleic sunflower oil. The higher melting-point fats in the food composition of the invention may comprise shea butter, for example fractionated or interesterified shea butter, and the lower melting-point fats in the food composition of the invention may comprise sunflower oil, for example high oleic sunflower oil. The higher melting-point fats in the food composition of the invention may comprise illipe butter, for example fractionated or interesterified illipe butter, and the lower melting-point fats in the food composition of the invention may comprise sunflower oil, for example high oleic sunflower oil. The higher melting-point fats in the food composition of the invention may comprise high stearic sunflower oil stearin, and the lower melting-point fats in the food composition of the invention may comprise high oleic sunflower oil.

Typically, lower melting fats have lower levels of saturated fatty acids than higher melting fats. Consumption of saturated fatty acids have been linked to increased levels of LDL cholesterol in the blood and heart diseases and so it would be advantageous to be able to reduce the consumption of saturated fatty acids. By being able to create a food product based on an emulsion from a lipid phase with a high percentage of lower melting fats the invention provides a means to reduce the saturated fatty acid content of edible emulsions. The food composition of the invention may be low in saturated fatty acids, for example the food composition of the invention may have a saturated fatty acid content of less than 70 wt. % of the total fatty acid content, for example less than 45 wt. % of the total fatty acid content, for example less than 35 wt. % of the total fatty acid content, for further example less than 25 wt. % of the total fatty acid content. The foam emulsified within the food composition of the invention provides an equivalent volume for less weight of material and hence reduces the total fat and therefore the saturated fatty acid content of the food.

The aqueous phase of the lipid-in-water emulsion according to the invention may or may not be foamed. Foaming the aqueous continuous phase of an emulsion is liable to cause noticeable changes in the texture of the emulsion. Such changes may be desirable, but in the case of a reduced calorie and/or reduced fat product, the aim is generally to produce a food product with a texture close to the full-fat version. It is therefore beneficial in the food composition of the present invention that it is only the lipid in the lipid-in-water emulsion that is foamed, not the whole emulsion. Some gas may be entrained into the aqueous phase of the lipid-in-water emulsion during emulsification, but in the context of the present invention, the aqueous phase is considered not to be foamed if it has a porosity of less than 5%, for example less than 1%.

The food composition of the invention may be selected from the group consisting of a sauce, a soup, a spread, a confectionery filling (for example a filling within a chocolate shell) or a beverage. The food composition of the invention may be a savoury sauce, for example a vinaigrette (traditionally oil emulsified in vinegar, sometimes emulsified with mustard), mayonnaise (traditionally oil emulsified in lemon juice and water, emulsified with egg yolk), hollandaise (traditionally melted butter emulsified in lemon juice and water, emulsified with egg yolk), and beurre blanc (traditionally butter emulsified in white wine vinegar, emulsified by milk components in the butter). The food composition of the invention may be a sweet sauce, for example a fruit emulsion used as an ice-cream topping. The sauces may be food industry adaptations of the traditional recipes. A spread is a soft paste which can, for example, be spread on bread. The spread of the invention may contain chocolate and/or nuts such as hazelnuts. The beverage according to the invention may be a beverage creamer, for example a liquid coffee whitener.

In a further aspect, the invention provides a process for forming a food composition, the process comprising the steps of; providing a first composition comprising triglycerides and having a lipid continuous phase; controlling the temperature of the first composition such that the composition comprises triglyceride crystals and has a solid lipid content between 0.1 and 20%; aerating the first composition to form a foam; providing a second composition having an aqueous continuous phase and comprising an emulsifier; and mixing the first and second compositions to form a lipid-in-water emulsion having gas dispersed in the lipid in the form of a foam. The lipid continuous phase of the first composition may have a triglyceride content greater than 50 wt. %, for example greater than 80 wt. %, for example greater than 95 wt. %. The first composition may have a lipid content greater than 50 wt. %, for example greater than 80 wt. %, for example greater than 95 wt. %, for further example being 100% lipid. The foam formed by aerating the first composition may comprise gas bubbles having their surface occupied by crystals comprising triglycerides. In the context of the present invention the term aerating refers to foaming by the incorporation of gas bubbles, the gas not necessarily being air. Aeration may be achieved by any of the techniques known in industry, for example mechanical agitation, passive mixing (e.g. passing through slit or nozzle), pressure drop (e.g. to vacuum, or from elevated pressure to atmospheric pressure) or sparging (when a chemically inert gas is bubbled through a liquid).

The first composition may form a gel after its temperature has been controlled such that the composition comprises triglyceride crystals and has a solid lipid content between 0.1 and 20%. A gel is a non-fluid network characterised by a continuous liquid throughout its whole volume. The gel optionally formed in the process of the invention may have a continuous lipid phase. The gel optionally formed in the process of the invention may have a gel property arising from a crystal network, for example a network of crystals of average size below 100 microns throughout the matrix. The gel of the process of the invention may have between 3 and 30% of the total lipid by weight in the form of crystals, for example between 5 and 20%. A gel may be defined by its rheology. For example at a frequency of 1 Hz, the measured linear shear elastic modulus G' of a gel may be greater than 10 Pa and the viscous modulus G" may be less than G'. Gels most suitable for foam generation have a linear shear elastic modulus G' initially in the range $10^2$-$10^7$ Pa at 1 Hz, for example a linear shear elastic modulus G' initially in the range $10^2$-$10^6$ Pa at 1 Hz, for further example a linear shear elastic modulus G' initially in the range $10^3$-$10^6$ Pa at 1 Hz.

The emulsifier comprised within the second composition in the process of the invention may be from a natural source. The emulsifier may be comprised within a food ingredient, for example it may be phospholipids comprised within egg yolk or milk; proteins such as casein from milk, or it may be components of the mucilage surrounding seed hulls such as mustard.

The lipid in the first composition according to the process of the invention may comprise one or more higher melting-point fats and one or more lower melting-point fats and the melting-point of the lowest melting higher melting-point fat may be at least 10° C. above that of the melting point of the highest melting lower melting-point fat and the lower melting-point fats may be present at a level of greater than 50 wt. % of the total lipid in the first composition.

The higher melting-point fats may be selected from the group consisting of cocoa butter, shea butter, illipe butter, sal fat, kokum butter, mango kernel fat, palm kernel oil, palm oil, coconut oil, milk fat, high stearic sunflower oil and hydrogenation products, inter-esterification products, fractions and combinations of these; and the lower melting-point fats may be selected from the group comprising sunflower oil, coconut oil, safflower oil, rapeseed oil, olive oil and combinations and fractions of these. For example the higher melting point fat may be selected from the group comprising cocoa butter, cocoa butter equivalents and cocoa butter improvers. The higher melting point fat may be a cocoa butter equivalent or improver and the lower melting point fat may be sunflower oil, for example high oleic sunflower oil.

The first composition may comprise a range of different triglycerides with different melting points. The crystallization behaviour of the first composition may be examined using differential scanning calorimetry (DSC). Aeration may be performed at a temperature below the highest melting peak maximum, the temperature being such that the composition has a solid lipid content between 0.1 and 20%, preferably at a temperature below the whole peak area of the highest endothermic melting peak. For example, in a mixture of 20% cocoa butter in high oleic sunflower oil, the highest melting peak was found to have a maximum at 23° C. A stable foam, capable of being emulsified into an aqueous phase may be obtained by aerating the mixture which had been recently cooled to a temperature of 17° C., the solid lipid content being between 0.1 and 80%.

Cooling the first composition will promote the formation of crystals. This can be enhanced by the addition of small crystals, for example crystals of a higher melting fat.

The added crystals may themselves occupy the surface of the gas bubbles when the first composition is aerated, or they may promote the growth of crystals which occupy the surface of the gas bubbles or a mixture of both. Accordingly, triglyceride crystals may be added to the first composition in the process of the invention, for example they may be added whilst controlling the temperature of the first composition.

In an embodiment of the process of the invention, the first composition may comprise between 70 and 95% of lower melting-point fats on a total lipid basis, the lower melting-point fats having a highest melting point below 10° C. (for example below 0° C.); and between 5 and 30% of higher melting-point fats on a total lipid basis, the higher melting-point fats having a lowest melting point above 30° C. (for example above 35° C.). The temperature of the first composition may be controlled to between 0 and 25° C. (for example between 0 and 10° C.) before aeration. The temperature of the first composition may be controlled to between 0 and 25° C. (for example between 0 and 10° C.) during aeration. The first and second compositions may be mixed at a temperature below 25° C., for example between −10° C. and 25° C.

The lipid phase in the first composition according to the process of the invention may have broad crystallization peaks, for example at least 80% of its total crystallization enthalpy between 80° C. and −20° C. may occur in a temperature range of at least 20° C., for example a range of at least 30° C. The lipid phase in the foam of the invention may have at least 50% of its total crystallization enthalpy between 80° C. and −20° C. occurring in a temperature range between 40° C. and 15° C., for example at least 80% of its total crystallization enthalpy between 80° C. and −20° C. occurring in a temperature range between 40° C. and 3.5° C. The lipid phase in the foam of the invention may have at least 50% of its total crystallization enthalpy between 80° C. and −20° C. occurring in a temperature range between 20° C. and −5° C., for example at least 80% of its total crystallization enthalpy between 80° C. and −20° C. occurring in a temperature range between 20° C. and −5° C.

The first composition may initially be at a temperature at which it contains less than 0.1 wt. % solid lipid in the process of the invention. For example it may be at a temperature at which it contains no solid lipid. Starting with less than 0.1 wt. % solid lipid, or no solid lipid, makes it easier to control the conditions such that a proportion of the composition crystallizes, providing suitable crystals for occupying the surface of gas bubbles in the foam generated during the process of the invention.

The inventors have found that improved results (e.g. lower density foams and greater stability) may be obtained if the first composition is allowed to mature between controlling the temperature such that the composition comprises triglyceride crystals and the aeration step. The maturation period may be at least 5 minutes, for example at least 30 minutes, for further example at least 1 hour, for still further example at least 24 hours. The first composition may be maintained at any temperature during the maturation period as long as the composition maintains a solid lipid content between 0.1 and 20%. The inventors have found that the higher the temperature of the gel when it is whipped, the lower the density of foam obtained, providing the temperature is not raised to the point that all triglyceride crystals melt. For example, the composition comprising triglycerides may be cooled rapidly, such as in a freezer at −18° C. to form a gel, and then allowed to warm up to a temperature at which only a few percent solid lipid remains before being aerated.

The aeration step in the process of the invention may comprise mechanical agitation, for example whipping. The inventors have found that although foams could be obtained by non-mechanical agitation methods, such as dissolving or dispersing gas under pressure and then releasing it, to obtain the most stable foams it was preferable to apply mechanical agitation. Without wishing to be constrained by theory, the inventors believe that mechanical agitation increases the wrapping of the gas bubbles with triglyceride crystals. Mechanical agitation may for example be applied using rotor-stator type of equipment, such as a Haas-Mondomix aerating system. After formation, and maturation (if any), the first composition may be gently sheared to allow an easy transfer to the aerating system. Mechanical agitation, for example whipping, may be applied for at least 5 s (such as the residence times in a continuous rotor-stator system), for example at least 1 minute, for example at least 5 minutes (such as in a batch whipping machine), for example at least 10 minutes, for further example at least 30 minutes. Foam stability generally increases with increasing mechanical agitation time. In contrast to many foams, the foam generated during the process of the invention is not particularly sensitive to over-whipping. The aeration step in the process of the invention may comprise gas depressurization followed by mechanical whipping. Such a combination of initial bubble generation using dissolved/dispersed gas and a pressure drop followed by mechanical agitation may usefully be employed, however all process steps may be performed at or near atmospheric pressure, for example at an absolute pressure of between 800 hPa and 2100 hPa, for example between 850 hPa and 1100 hPa.

The process of the invention may further comprise adding additional food ingredients. A further lipid-containing composition may be mixed with the foamed first composition, either simultaneously with mixing it with the second composition or before it is mixed with the second composition. The further lipid-containing composition may be liquid. When the further lipid-containing composition is mixed with the foamed first composition before being mixed with the second composition a greater proportion of the oil droplets in the resulting emulsion will contain air bubbles.

In an embodiment of the process of the invention where the food composition is a mayonnaise, the process may comprise the steps of; providing a first composition comprising between 70 and 95 wt. % of a lower melting point fats, fully liquid at 0° C.; and between 5 and 30% of a higher melting-point fats, with a melting point between 30 and 50° C.; controlling the temperature (for example by heating) of the first composition such that it has a solid lipid content below 0.1% and then controlling the temperature (for example by cooling) such that it has a solid lipid content between 0.1 and 20% (for example forming a gel); aerating the first composition to form a foam (for example by mechanical whipping); providing a second composition having an aqueous continuous phase and comprising egg yolks and optionally mustard; and mixing the first and second compositions to form a lipid-in-oil emulsion having gas dispersed in the lipid in the form of a foam. Additional liquid lower melting-point fats may be mixed with the aerated first composition before it is mixed with the second composition. An acidic aqueous food liquid such as vinegar or lemon juice may be added to the second composition before the aerated first composition is mixed in, or during the addition of the aerated first composition. The aerated first composition is preferably mixed gently with the second composition. Good results may be obtained by introducing the aerated first composition to the second composition gradually.

The higher melting-point fats in the first composition of the mayonnaise may be selected from the group consisting of cocoa butter, cocoa butter equivalent, shea butter, illipe butter, palm oil and combinations of these; and the lower melting-point fats may be selected from the group comprising sunflower oil, safflower oil, rapeseed oil, soybean oil, olive oil and combinations of these. The higher melting point fat may be cocoa butter equivalent and the lower melting point fat may be sunflower oil, for example high oleic sunflower oil.

In an embodiment of the process of the invention where the food composition is a liquid beverage creamer, the process may comprise the steps of; providing a first composition comprising between 70 and 95 wt. % of a lower melting point fats, fully liquid at 0° C.; and between 5 and 30% of a higher melting-point fats, with a melting point between 30 and 50° C.; controlling the temperature (for example by heating) of the first composition such that it has a solid lipid content below 0.1% and then controlling the temperature (for example by cooling) such that it has a solid lipid content between 0.1 and 20% (for example forming a gel); aerating the first composition to form a foam (for example by mechanical whipping); providing a second composition having an aqueous continuous phase and comprising protein (for example sodium caseinate), sweetener (for example sucrose) and emulsifier (for example lecithin); and mixing the first and second compositions to form a lipid-in-oil emulsion beverage creamer having gas dispersed in the lipid in the form of a foam. The first and second compositions may for example be mixed using a high-shear mixer at a temperature at which the first composition had a solid lipid content between 0.1 and 20%. In order to maintain the mixture at the desired temperature it may be necessary to cool the mixing apparatus below the desired temperature. For example, if the desired mixing temperature is 4° C., the mixing head of the high shear mixer may be cooled to −10° C.

Those skilled in the art will understand that they can freely combine all features of the present invention disclosed herein. In particular, features described for the product of the present invention may be combined with the process of the present invention and vice versa. Further, features described for different embodiments of the present invention may be combined. Where known equivalents exist to specific features, such equivalents are incorporated as if specifically referred to in this specification. Further advantages and features of the present invention are apparent from the figures and non-limiting examples.

EXAMPLES

Example 1: Formation of Stable Foams with Cocoa Butter in High Oleic Sunflower Oil High Oleic Sunflower Oil (HOSFO) having a melting point of −17° C. (±3)° C. was obtained from SABO Nestrade. Cocoa butter (Pure Prime Pressed) having a melting point of 35° C. (±3)° C. was obtained from Cargill.

Figure 1:
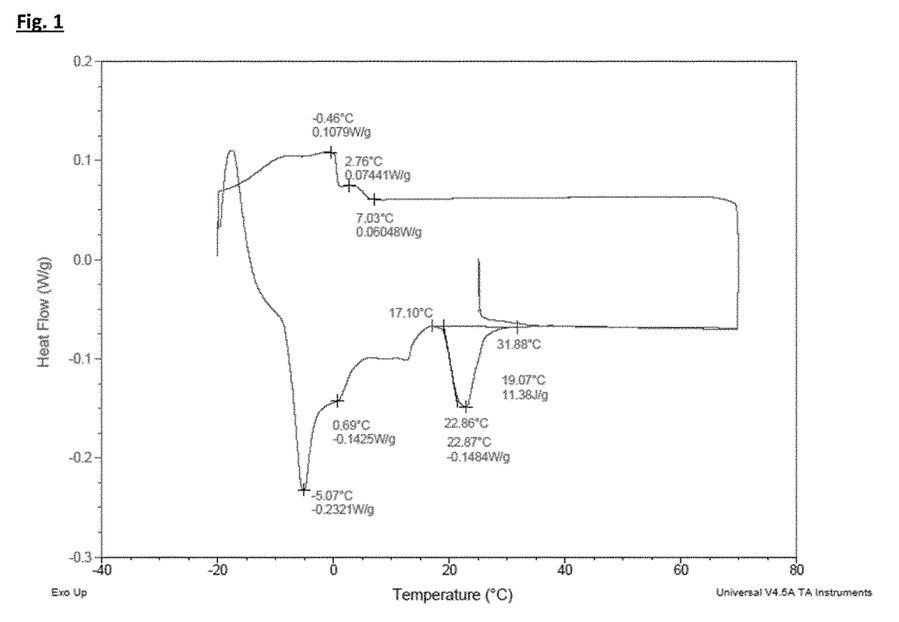
FIG. 1 shows a differential scanning calorimeter crystallization and melting trace for 20 wt. % cocoa butter in high oleic sunflower oil.

The melting and crystallizing profile of 20 wt. % cocoa butter in HOSFO was measured by DSC using a SDT Q600 from TA instruments. A sample of around 10-20 mg of cocoa butter in HOSFO was heated to 70° C. before recording the crystallization signature. After cooling to −20° C., it was reheated to 70° C. to record the melting signature. The DSC trace is shown in FIG. 1. It can be seen that the highest melting peak has a peak maximum at about 23° C. and the peak starts at around 17° C. Although different lipids and crystalline forms may have slightly different specific melting enthalpies, the area under the melting peaks in the reheating trace provides a reasonable correlation with the quantity of lipid melting. From the DSC reheating trace it can be seen that by 5° C. less than 60% of the lipid remains solid.

Figure 2:
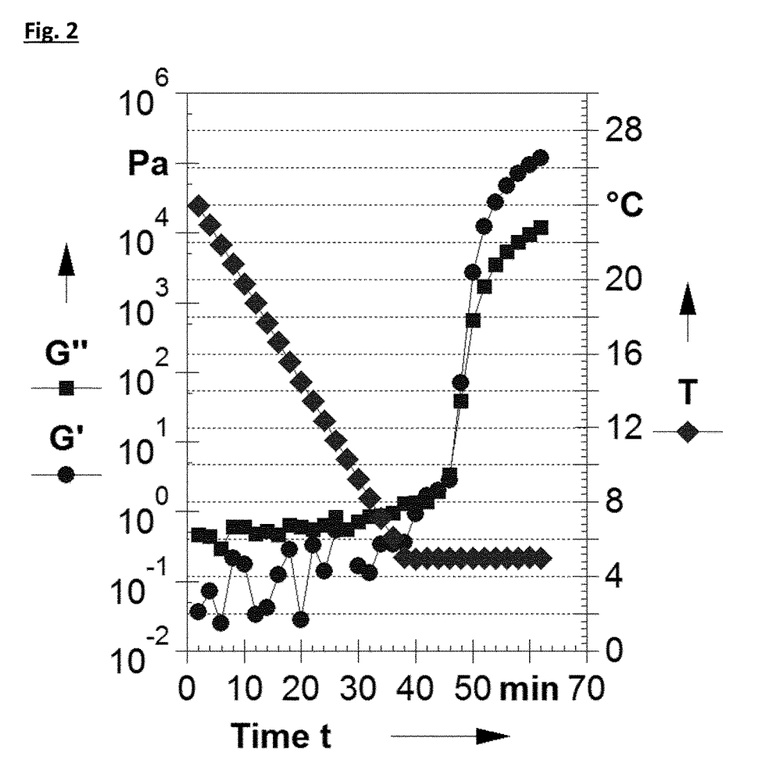
FIG. 2 shows the evolution of rheological properties during gelation as cooling is applied from fully melted state down to 5° C., for 20% cocoa butter in HOSFO.

The formation of a gel was confirmed. FIG. 2 shows the evolution of G' (●) and G" (■) with time (sec), recorded at 1 Hz, for 20% cocoa butter (PPP) in HOSFO cooling down from 25° C. to 5° C. (♦) and stabilizing at 5° C., with a cooling rate of 0.5° C./min. The strain amplitude was kept at 0.005% to ensure to be in the linear deformation regime. Geometry used was concentric cylinders. Gelation profile of 20% cocoa butter in HOSFO as temperature was lowered from 25° C. to 5° C. The mixture was initially heated up to 70° C. for achieving complete dissolution, then the temperature was lowered to 25° C. within ½ hour prior to recording rheological data during gelation. It can be seen that after 45 minutes when the gel forms, G' is greater than G" and G' is greater than 10 Pa.

1.1 Gel at 4° C., Whipping at 20° C.

Mix preparation: 20% (w/w) cocoa butter in HOSFO was heated to 70° C. until complete dissolution. 250 g of the heated solution was placed in a double-jacketed glass container. The mixture was cooled down over 20 hours by applying water at 4° C. to the jacket. The gel obtained was placed at 20° C. in a Hobart N50 planetary kitchen mixer fitted with a balloon whisk at speed 2 for 15, 30, 45 min. A foam with an overrun of 240% was obtained. (Overrun is the volume of gas incorporated into the foamed material/volume of the un-foamed material, expressed in %.) The bubble size distribution was wide, with an average size estimated in the range 0.02-0.05 mm, but with only a very small fraction (less than 5%) of bubbles larger than 0.1 mm. The foam had good stability at low temperatures, but if maintained at room temperature it collapsed over 1 hour.

1.2 Gel at 4° C., Whipping at 5° C.

Figure 3:
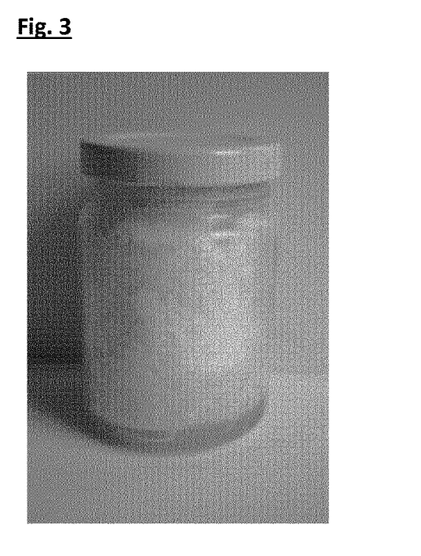
FIG. 3 shows a 20 wt. % cocoa butter in high oleic sunflower oil foam, prepared as described in example 1, trial 1.2, after 7 days of storage.

The protocol was same as 1.1 above except that the whipping was performed at 5° C. by placing the kitchen mixer in a cold room. A high overrun foam was achieved (200% after 15 minutes whipping). Bubble size distribution was wide, with an average size estimated in the range 0.03-0.05 mm, but with only a very small fraction (less than 5%) of bubbles larger than 0.1 mm. The foam had good stability at low temperatures, but if maintained at room temperature after foaming, the foam showed around 1 cm of drainage after 7 days of storage at room temperature (see FIG. 3).

1.3 Gel Held at 5° C. for 1 Week—Foaming at 5° C.

Figure 4:
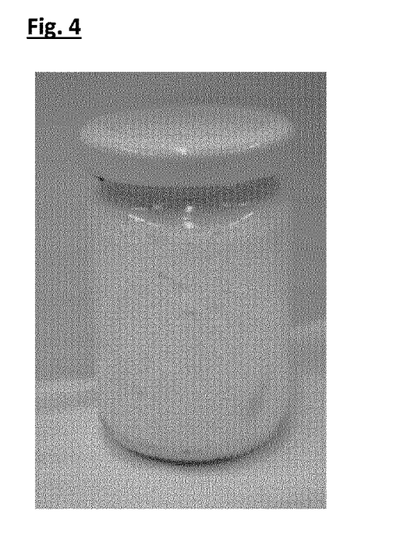
FIG. 4 shows a 20 wt. % cocoa butter in high oleic sunflower oil foam, prepared as described in example 1, trial 1.3, after 7 days of storage.

The protocol was the same as 1.1 above, except that 250 g of the mix was stored at 5° C. for 1 week, which allowed for recrystallization. The gel was then whipped at 5° C. for 15 min, 30 min and 45 min. A high overrun foam was achieved (180% after 15 minutes whipping and 235% after 30 minutes whipping). Average bubble size was smaller than in the earlier trials, estimated to be 0.03-0.05 mm, leading to very white appearance of foam. Foam showed a better stability at room temperature, i.e. it could be stored for weeks without apparent macroscopic collapse, and with very limited drainage (below 1 mm of drainage after 7 days of storage) (see FIG. 4).

1.4 Gel Held at 5° C. for 1 Week—Foaming at 20° C.

The protocol was the same as in 1.3 above except that whipping was performed at 20° C. A high overrun foam was achieved (225% after 15 minutes). Stability and bubble size was similar to 1.3.

1.5. Gel Held at 5° C. for 2 Weeks—Foaming at 5° C.

The protocol was same as in 1.3 except the gel storage duration which was 2 weeks. The stability and bubble size was similar to 1.3.

Summary of results foaming 20% cocoa butter in high oleic sunflower oil:

| Conditions | Max overrun |
| --- | --- |
| Gel 4° C. - Foamed at 20° C. | 243% |
| Gel 4° C. - Foamed at 5° C. | 245% |
| Gel held at 5° C. for 1 week. Foamed at 5° C. | 235% |
| Gel held at 5° C. for 2 weeks. Foamed at 5° C. | 200% |
| Gel held at 5° C. for 1 week. Foamed at room temperature | 226% |

Example 2: Foams with Cocoa Butter in High Oleic Sunflower Oil with Addition of Maltodextrin Particles Mix preparation: 20 wt. % cocoa butter, 10 wt. % maltodextrin particles (DE11-14) in HOSFO was heated to 70° C. until complete dissolution of the cocoa butter. 250 g of the mix placed in a closed vial. The vial was placed in water, cooled within a double-jacketed container (cooling water at 4° C.) for 20 hours. The gel obtained was stored at 5° C. for 1 week before being placed in a Hobart kitchen mixer at 5° C. fitted with a balloon whisk and whipped at speed 2 for 15 min, 30 min and 45 min. The resulting foam was compared with trial 1.3 above which had the same conditions apart from no maltodextrin particles. The foam with maltodextrin particles has a maximum overrun of 214% (compared to 235% for the sample with no particles). However, the trial with maltodextrin had improved stability against coarsening over time and showed better homogeneity of the foam.

Example 3: Foaming of Other Fats at 20 wt. % in High Oleic Sunflower Oil

A series of other fats were prepared at 20 wt. % in high oleic sunflower oil, being completely melted and then cooled to a gel. The samples were whipped as in example 1.

| Fat | Conditions | Max overrun & comments |
| --- | --- | --- |
| Refined hydrogenated coconut oil, Mpt. 38° C. (Peerless Foods, Australia) | Gel stored at 15° C. for 15 h, then at 5° C. for 1 h. Whipped at 5° C. | 187% Poor storage at 20° C., but good at 5° C. |
| Hydrogenated palm kernel oil, Mpt. 45° C. (Lam Soon, Thailand) | Gel stored at 15° C. for 15 h, then at 5° C. for 2 h. Whipped at 5° C. | 177% Stable at 20° C. without drainage after 7 days but with some contraction |
| Cocoa Butter equivalent, Mpt. 45° C. (Loders Croklaan) | Gel stored at 15° C. for 15 h, then at 5° C. for 20 h. Whipped at 5° C. | 264% Stable at 20° C. without drainage after 7 days |
| High melting palm fraction, Mpt. 60° C. (AAK Sweden) | Gel stored at 20° C. for 16 h, then at 5° C. for 1 h. Whipped at 5° C. | 141% Stable at 20° C. without drainage after 7 days |
| Interesterified cocoa butter, Mpt. 52° C. (Cargill) | Gel stored at 5° C. for 5 h, then at 5° C. for 1 h. Whipped at 5° C. | 75% 1 cm drainage after 7 days at 20° C. |

Example 4: Foaming of Single Oil

High stearic sunflower oil stearin (Nutrisun) is a high melting fraction of sunflower oil. Melting point 32° C. (±3° C.).

The high stearic sunflower oil stearin was heated to 90° C. to ensure complete dissolution of crystals. 250 g of the heated solution was placed in a double-jacketed glass container. The mixture was cooled down over 20 hours by applying water at 20° C. to the jacket. The gel obtained was placed in a Hobart kitchen mixer fitted with a balloon whisk at speed 2 for 15 min. High overrun foam was made (max overrun=277% after 45 min whipping). This foam showed good heat stability without apparent macroscopic destabilization and without apparent drainage after 7 days of storage. Bubble size distribution was very wide, with an average size estimated in the range 0.06-0.08 mm, but with only a very small fraction (less than 5%) of bubbles larger than 0.1 mm. This demonstrates that foams may be produced from single fats (for example vegetable fats from a single plant source), the crystals occupying the surface of the gas bubbles necessarily coming from the same fat.

Example 5: Bubbles Coated by Crystals

Figure 5:
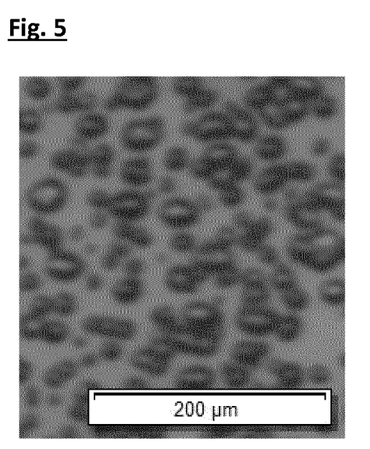
FIG. 5 is a micrograph of 20 wt. % cocoa butter in high oleic sunflower oil foam, prepared as described in example 1, trial 1.5, showing the absence of shape relaxation in the dense layer of crystals adsorbed at the surface of the bubbles.
Figure 6:
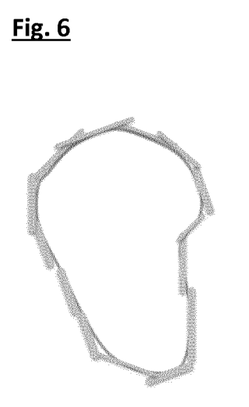
FIG. 6 is a schematic illustration of the absence of shape relaxation around a bubble.

FIG. 5 shows the dense layer of crystals absorbed at the surface of bubbles in a micrograph of the cocoa butter/high oleic sunflower oil foam formed in trial 1.5 above. The image illustrates the type of non-spherical shapes that are found under the microscope, whereby interfacial stabilization by surface adsorption of a dense layer of crystals creates the property of the non-relaxing shape (shown diagrammatically in FIG. 6). By diluting the foam with liquid oil (e.g. the same liquid oil used for foaming) the bulk rheological effects normally acting on bubble shape are suppressed, but the interfacial stabilization of the crystals around the bubbles can be observed by the fact that the bubble shapes do not relax. From microscopical observations of these foams, around 50% of bubbles were found to have a surface coverage at least 50% of the maximal surface coverage. Maximal surface coverage corresponds to a jammed structure of crystals adsorbed at a bubble's interface, or at the interface between two bubbles. The dense packing of crystals at bubble interfaces gives good stability.

Figure 7:
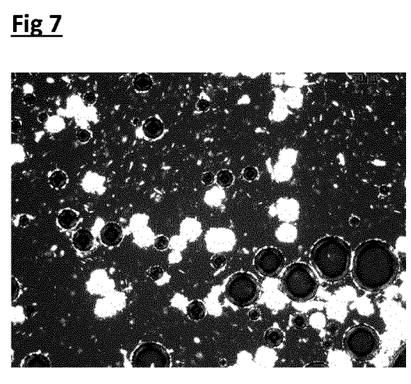
FIG. 7 is a polarized optical micrograph of a foam of 20 wt. % high melting palm fraction in high oleic sunflower oil.
Figure 8:
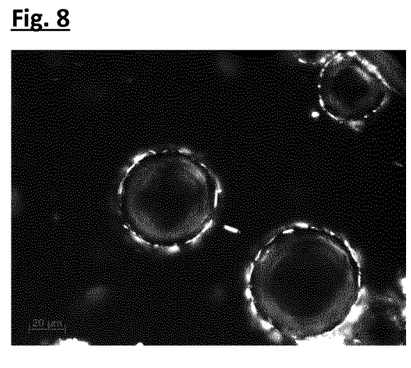
FIG. 8 is a polarized optical micrograph of a foam of 20 wt. % high melting palm fraction in high oleic sunflower oil, diluted by a factor of around 5.

A high melting palm oil fraction (AAK, Sweden) was foamed in HOSFO and the structure studied by microscopy. Mix preparation: 20% high melting palm oil fraction was dissolved in HOSFO by heating to 75° C. A gel formed during storage at 20° C. for 16 h. 250 g of the gel obtained was placed in a Hobart kitchen mixer and whipped at speed 2 for 45 minutes. FIG. 7 shows a polarized micrograph of the foam not diluted, and then FIG. 8 shows the foam diluted by a factor of around 5 with HOSFO. The micrographs show triglyceride crystals coating the interfaces between bubbles.

Example 6: Foams Stabilized by Triglyceride Crystals—Visualization of the Adsorbed Triglyceride Crystals at Interface by Optical Microscopy HOSFO and 10 wt % cocoa butter improver (CBI) were mixed at 60° C. until complete dissolution. The CBI (Illexao HS90-AAK) is based on fractionated shea butter and has a melting point of 43° C.±3° C. The HOSFO/CBI mixture was removed from the hot plate and left to cool overnight at 5° C. The mixture formed a gel with a paste-like consistency. Foam was generated in a Hobart mixer with balloon whisk, speed 2, for 20 min at 5° C. During whipping, air is incorporated into the gel matrix and forms bubbles coated by crystals that ensure long-term mechanical stability to the foam.

Figure 9:
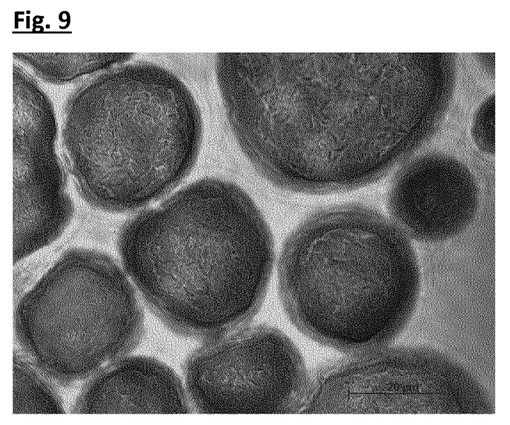
FIG. 9 is a micrograph of a foam consisting of high oleic sunflower oil and cocoa butter improver
Figure 10:
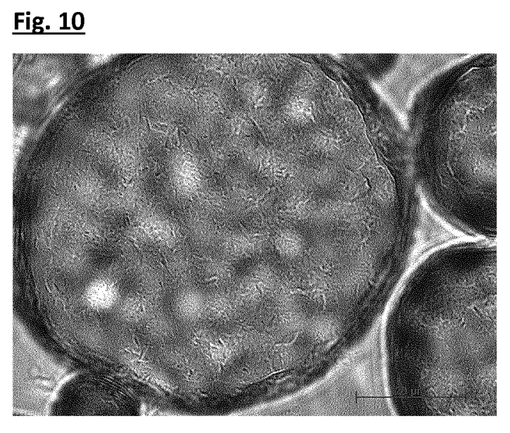
FIG. 10 is a further micrograph of the foam shown in FIG. 9

The samples were examined using optical microscopy. A few drops of the aerated material was placed onto a glass slide and then imaged using appropriate magnification and brightfield illumination using a Zeiss optical microscope. The images (FIGS. 9 and 10) clearly show a complete layer of crystals adsorbed at the air/oil interface and forming a crust wrapping the bubbles. With such a high level of surface coverage it is immediately obvious after inspection by microscopy that at least 50% of the surface of the gas bubbles is occupied by crystals.

Example 7: Model Emulsion with Aerated Oil Droplets

A model emulsion was prepared with a dispersion of high oleic sunflower oil (HOSFO) droplets in a water phase containing sodium caseinate (NaCas). The oil content was varied from 20 up to 80 wt %.
The emulsion was prepared as follows:
Disperse the surface active material (NaCas) in the water phase
  Water (98 wt. %) is heated up to 25° C. and poured onto NaCas (2 wt. %)
  Powder is wetted into water by hand mixing
  Dispersion is kept under magnetic stirring for 1 hour at 25° C. The 2 wt. % NaCas solution obtained is a homogeneous liquid of light white colour.
Gently add HOSFO to the water phase while mixing with a kitchen hand mixer position 1 (Durabase Mixer, Migros, Switzerland) until a creamy-like homogeneous dispersion is obtained.

Figure 11:
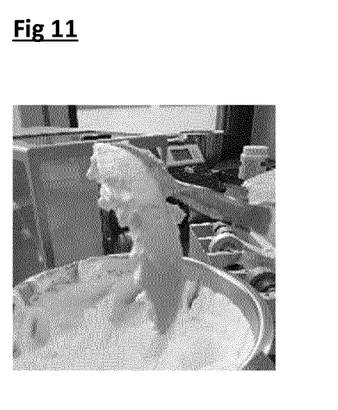
FIG. 11 shows an oil foam containing 10 wt. % CBE in high oleic sunflower oil

The emulsion preparation was then repeated, but part of the volume of oil replaced by an oil foam. The oil foam was prepared as follows:
10 wt. % of cocoa butter improver (Illexao HS90-AAK), was mixed with HOSFO and warmed until no solid remained. The mixture was placed at 4° C. until it formed a gel (approx. 5 hours) and the gel was then whipped (also at 4° C.) for 1 hour using a kitchen mixer (Hobart, Switzerland) equipped with a balloon whisk. The gel had a Vaseline®-like texture and colour while the processed oil foam was thick, smooth and white (FIG. 11). The foam was very stable at 4° C. with no drainage observed. The overrun was between 240-260 vol %, the porosity was therefore between 70 and 72.

Overrun is calculated as follows
OR/porosity: The levels of aeration have been estimated by overrun (OR) or porosity (φ) measurements in standardized 3 cL plastic cups.

$$\% OR = \frac{m_{non\ aerated} - m_{aerated}}{m_{aerated}} \times 100$$

$$\% \phi = \frac{OR}{OR + 100} \times 100$$

As an example, an overrun of 10% means that the product occupies 10% more volume for the same mass.

Figure 12:
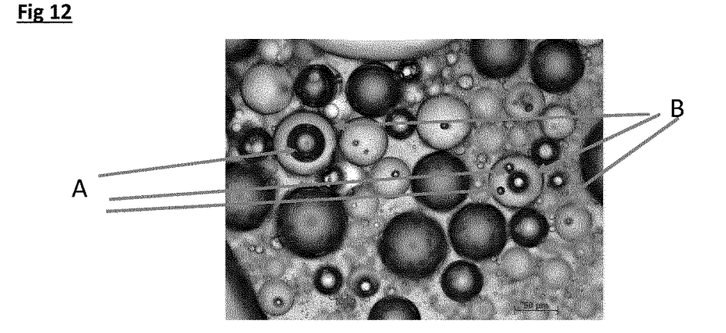
FIG. 12 is a micrograph of an emulsion where 50% by volume of the fat phase has been replaced by oil foam. Arrows indicate air bubbles (A) and oil droplets (B).
Figure 13:
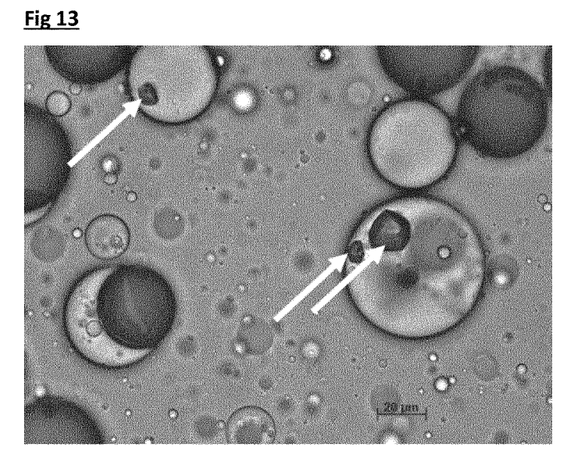
FIG. 13 is a further micrograph of the emulsion in FIG. 12. Arrows indicate air bubbles in the oil droplets having triglyceride crystals at their gas-lipid interface.

Emulsions were prepared with the un-aerated oil replaced at levels of 20, 50 and 80% by volume. All emulsions were stable. The emulsions were examined by light microscopy (Zeiss, Germany) after being diluted approximately 10 times in water. FIGS. 12 and 13 shows micrographs of an emulsion where 50% by volume of the fat phase (for an 80% oil emulsion) has been replaced by the oil foam. In FIG. 12 arrows indicate air bubbles (A) and oil droplets (B). Arrows in FIG. 13 indicate air bubbles in the oil droplets having triglyceride crystals at their gas-lipid interface.

Example 8: Mayonnaise with Aerated Oil Droplets

A standard mayonnaise recipe was prepared:

| | |
|---|---|
| High oleic sunflower oil | 250 g |
| Mustard | 10 g |
| Salt | 1.3 g |

| | |
|---|---|
| Egg yolk (liquid) | 32.0 g |
| Lemon juice | 19 g |
| Vinegar | 15 g |

The oil phase was 76 wt. % of the mayonnaise (80 wt. % excluding the dry ingredients; salt and mustard). The mayonnaise was prepared by mixing together mustard, salt, lemon juice, egg yolk and vinegar. The mixture was homogenized using a hand kitchen mixer (Durabase mixer, Migros, Switzerland) at the shearing position 1. HOSFO was then slowly added while mixing the preparation using the kitchen mixer to form an emulsion having a mayonnaise-like thick texture. Structure-wise; egg yolk phospholipids stabilize the water/oil interface, with the other ingredients being dispersed or dissolved in the aqueous phase.

Further mayonnaise samples were prepared with 50% and 100% of the volume of the oil being replaced by an oil foam (10% CBI in HOSFO) prepared as in example 7. In the case of 50% replacement, un-aerated HOSFO (125 g) was gently mixed into the same volume (approx. 35 g) of oil foam at 4° C. to form a diluted foam. The mayonnaise was prepared as before by mixing together mustard, salt, lemon juice, egg yolk and vinegar. The diluted foam was then slowly added while mixing the preparation using the kitchen mixer to form an emulsion having a mayonnaise-like thick texture. In the case of 100% replacement approximately 71.5 g of oil foam was slowly added to the mustard, salt, lemon juice, egg yolk and vinegar.

The mayonnaise prepared with the aerated foam had a lower density. For the 100% replacement it had an overrun of 28 vol % compared to the reference mayonnaise with un-aerated oil. As consumers generally add mayonnaise to their food by volume (for example a spoonful) this represents a reduction in fat consumed and a reduction in saturated fatty acids. The two types of mayonnaise were compared by a technical taste panel. The textures were considered similar, although the mayonnaise formed with an oil foam was considered less greasy.

Figure 14:
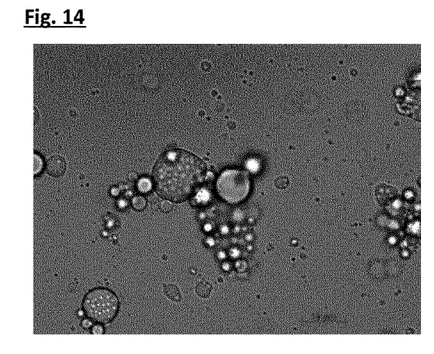
FIGS. 14 and 15 are microscopy images of a mayonnaise formed with an oil foam emulsified into the aqueous phase.
Figure 15:
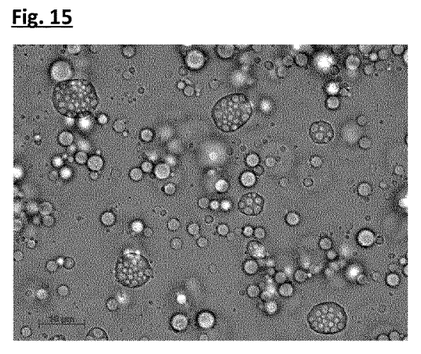

FIGS. 14 and 15 show microscopy images of the mayonnaise formed with the oil foam at 50% replacement of the oil. Air bubbles can be seen within the oil droplets.

The invention claimed is:

1. Food composition comprising a lipid-in-water emulsion wherein gas is dispersed in the lipid in the form of a foam, and the foam comprises gas bubbles having triglyceride crystals at their gas-lipid interface.

2. A food composition according to claim 1 wherein the triglyceride crystals occupy at least 50% of the surface area of the gas bubbles.

3. A food composition according to claim 1 wherein, at temperatures above 10° C., the bulk lipid does not contain a rigid network.

4. A food composition according to claim 1 wherein the lipid comprises one or more higher melting-point fats and one or more lower melting-point fats and wherein the melting-point of the lowest melting higher melting-point fat is at least 10° C. above that of the melting point of the highest melting lower melting-point fat and wherein the lower melting-point fats are present at a level of greater than 50 wt. % of the total lipid.

5. A food composition according to claim 4 wherein the one or more higher melting-point fats are selected from the group consisting of cocoa butter, shea butter, illipe butter, sal fat, kokum butter, mango kernel fat, palm kernel oil, palm oil, coconut oil, milk fat, high stearic sunflower oil and hydrogenation products, inter-esterification products, fractions and combinations of these; and the one or more lower melting-point fats are selected from the group comprising sunflower oil, coconut oil, safflower oil, rapeseed oil, olive oil and combinations and fractions of these.

6. A food composition according to claim 1 wherein the aqueous phase of the lipid-in-water emulsion is not foamed.

7. A food composition according to claim 1 wherein the food composition is selected from the group consisting of a sauce, a soup, a spread, a confectionery filling and a beverage.

8. A food composition according to claim 1 wherein the food composition has a saturated fatty acid content of less than 70 wt. % of the total fatty acid content.

9. Process for forming a food composition, the process comprising the steps of:
providing a first composition comprising triglycerides and having a lipid continuous phase;
controlling the temperature of the first composition such that the composition comprises triglyceride crystals and has a solid lipid content between 0.1 and 20%;
aerating the first composition to form a foam;
providing a second composition having an aqueous continuous phase and comprising an emulsifier; and
mixing the first and second compositions to form a lipid-in-water emulsion having gas dispersed in the lipid in the form of a foam.

10. A process according to claim 9 wherein the first composition is initially at a temperature at which it contains less than 0.1% solid lipid.

11. A process according to claim 9 wherein the aeration of the first composition comprises mechanical agitation.

12. A process according to claim 9 wherein the first composition, on a total lipid basis, comprises between 70 and 95% of lower melting-point fats having a highest melting point below 10° C., and between 5 and 30% of higher melting-point fats having a lowest melting point above 30° C.

13. A process according to claim 9 wherein the temperature of the first composition is controlled to between 0 and 25° C. before aeration.

14. A process according to claim 9 wherein a further lipid-containing composition is mixed with the foamed first composition before it is mixed with the second composition.

15. A process according to claim 9 further comprising adding additional food ingredients.

* * * * *